May 27, 1930. W. DREDGE 1,760,047
APPARATUS FOR THE MANUFACTURE OF BISCUITS OR THE LIKE
Filed June 21, 1927 3 Sheets-Sheet 1

May 27, 1930.  W. DREDGE  1,760,047
APPARATUS FOR THE MANUFACTURE OF BISCUITS OR THE LIKE
Filed June 21, 1927   3 Sheets-Sheet 3
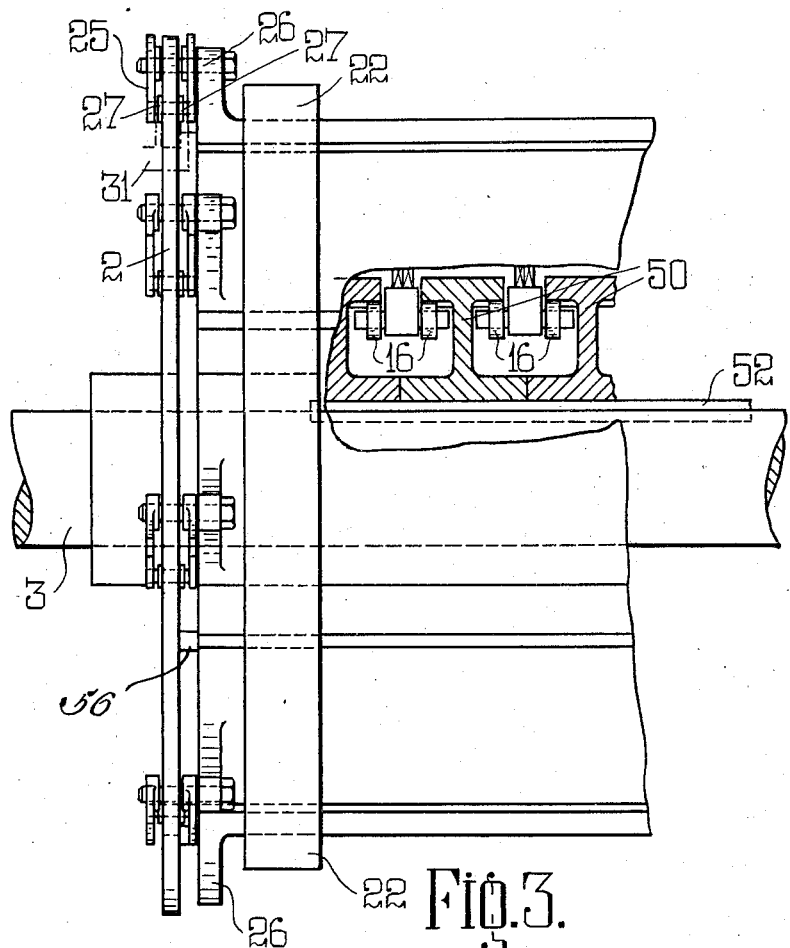
Fig.3.
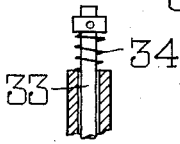
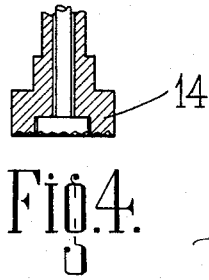
Fig.4.
Inventor:
William Dredge
By Dodge and Sons
Attorneys.

Patented May 27, 1930

1,760,047

UNITED STATES PATENT OFFICE

WILLIAM DREDGE, OF MANCHESTER, ENGLAND

APPARATUS FOR THE MANUFACTURE OF BISCUITS OR THE LIKE

Application filed June 21, 1927, Serial No. 200,486, and in Great Britain July 16, 1926.

This invention has for its object a new method of and apparatus for manufacturing biscuits or the like.

In making biscuits in the ordinary way the dough is rolled out into a sheet, and as the biscuits are cut out (which includes the moulding and embossing process) from this sheet, large quantities of scrap are left. This scrap is passed through the rolls to take its form in the sheet again and this re-rolling is repeated, with the result that the quality of the goods deteriorates. The chief object of my present invention is to avoid any unnecessary damage to the dough by excessive pressure through rolling and re-rolling; also to enable a first quality biscuit or the like to be made from soft doughs at high temperatures (e. g. 70° F.).

The method of manufacturing biscuits or the like according to the present invention consists in producing separate pieces of dough of predetermined size and weight to form each a single biscuit, feeding these dough pieces into moulding cells or recesses in a rotary drum, and moulding and embossing them therein by the action of reciprocating dies or plungers.

An apparatus for the manufacture of biscuits or the like according to my method comprises a suitable dough-divider, such as a wire cut-off depositor modified to cut a chunk of dough, for producing the separate pieces of dough of the required size and weight to form each a single biscuit, and a rotary drum or the like having a plurality of radial cells or recesses in its periphery forming moulds into which the said pieces of dough are fed and are moulded and embossed therein by the action of reciprocating dies or plungers arranged in said recesses or moulds. The moulding and embossing process is effected during the rotation of the drum, and the ejection of the moulded and embossed biscuits or the like is effected from the moulds at a suitable point in the rotation, preferably at a point diametrically opposite the position where the unmoulded pieces of dough are fed into the recesses or moulds. Means are provided to close the mouth of the recesses or moulds while the moulding and embossing operation is being performed.

In a preferred construction, the rotary moulding drum is arranged directly below the dough-divider so that the dough pieces will drop from the divider into the moulding cells which have arrived at the top of the drum, while simultaneously the moulded pieces are forcibly ejected from the moulds at a point diametrically opposite in the drum.

The invention will be further described with reference to the accompanying drawings, in which an example of construction of apparatus according to my invention is illustrated. In these drawings:—

Figure 3 is a side elevation, partly in section of one end of the said moulding drum.

Figure 4 is a detail view.

Figure 1:
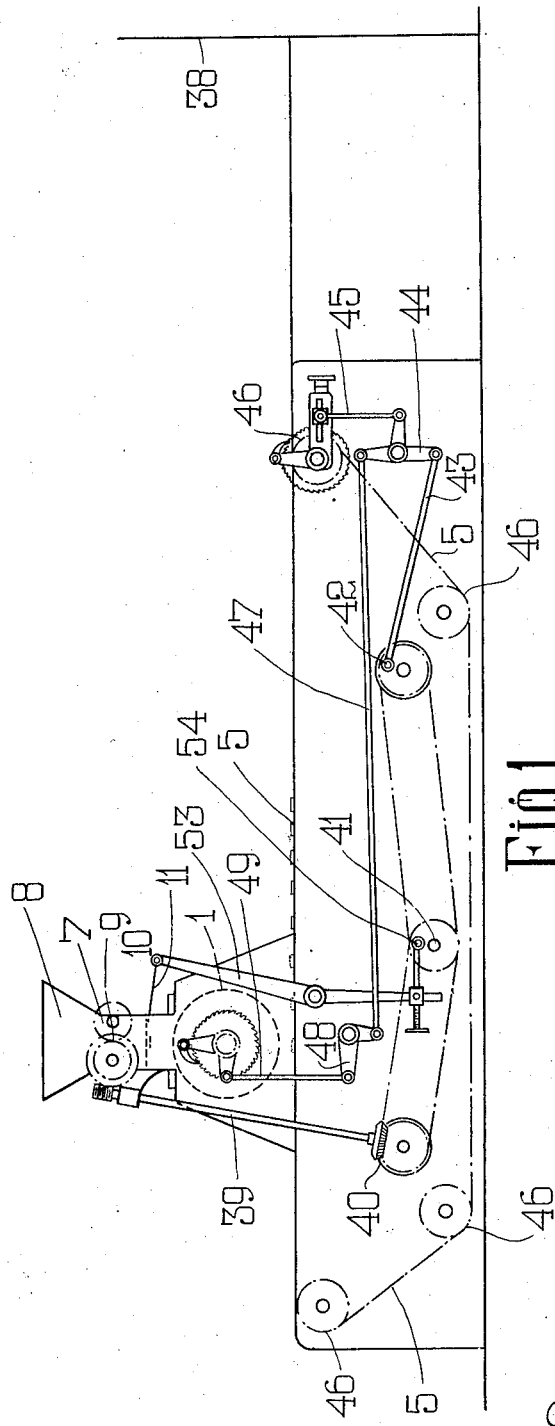
Figure 1 shows diagrammatically a front elevation of the complete apparatus.

Referring to these figures, 1 denotes the moulding drum, which is arranged to rotate intermittently about a stationary shaft 3, and is driven by ratchet mechanism 49 or other suitable mechanism. This rotary drum is situated preferably immediately above an endless conveyor 5, driven by the ratchet mechanism 45. Immediately above the rotary moulding drum 1 is arranged a dough divider 7 known in the bakery trade as a "wire cut-off depositor", and consisting in a hopper 8 to contain the dough and having a pair of rollers 9 for forcing the dough through a die-plate 10 and a reciprocating wire cutter 11 to cut off the dough. The number of openings in the die plate of the wire cut off depositor will correspond to the number of moulds in the length of the drum into which the dough pieces are dropped.

Figure 2:
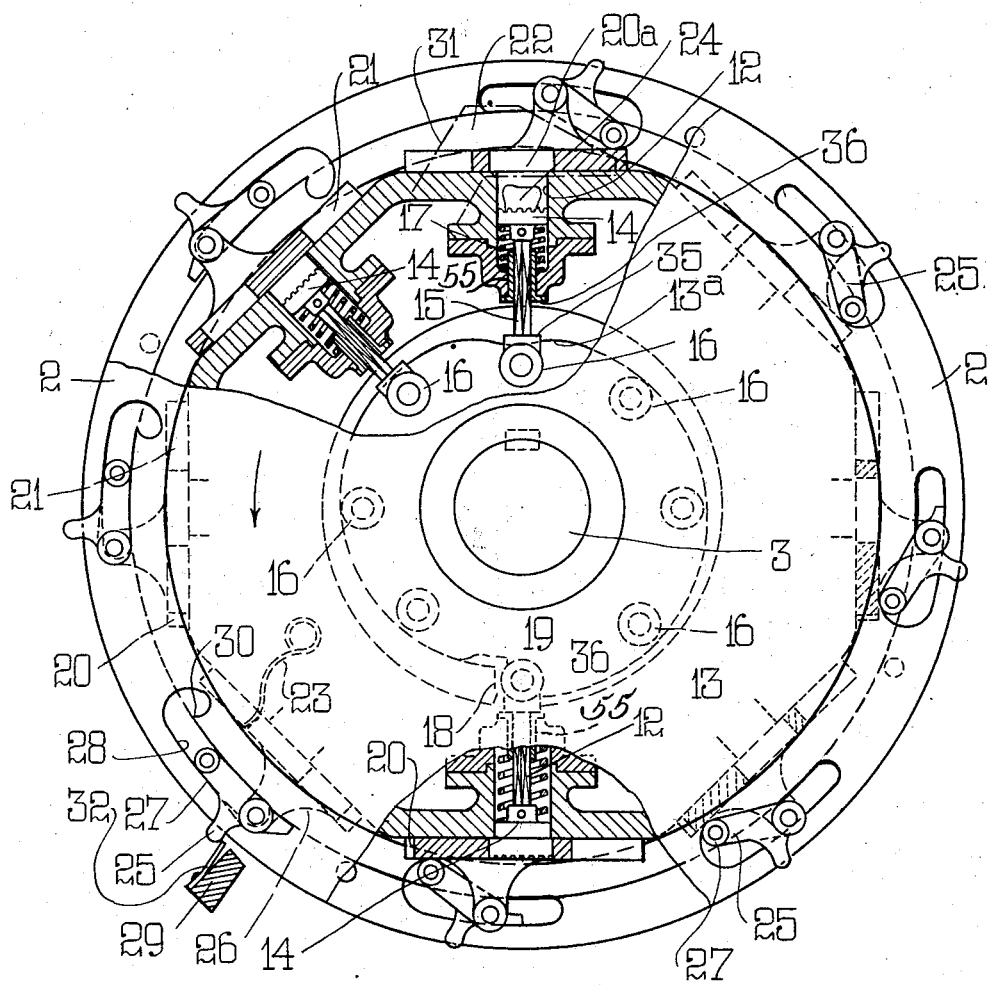
Figure 2 is an end elevation partly in section, of the rotary moulding drum three only of the eight rows of moulding units being fully drawn.

The rotary moulding and embossing drum is preferably made in the form of a regular polygon, with an equal number of flat faces, for instance octagonal, as shown in Figure 2, and in each flat face on the periphery of the drum is arranged a row of radial recesses or cells 12 forming moulds, so that the drum has thus eight rows of moulding and embossing units. The driving arrangement of this octagonal drum is such that the drum is rotated through 45 degrees at each step.

It is proposed to eject the moulded and embossed dough simultaneously with the dropping of the pieces of dough from the dough dividers 7. The rest period of the rotary drum 1 and the endless conveyor 5 will thus synchronize with the dropping of the pieces of dough into the moulds.

A stationary guide or cam-track 13 is arranged inside the drum and around it the drum rotates. The form of this cam track will be seen from Figure 2. Each moulding plunger or die 14 has a free movement in the mould 12, and has an extension or stem 15 extending inwards and having a roller 16 arranged on each side running on the cam track or guide 13. The plunger stem 15 is of square section to prevent turning and is guided in a bush 55. Each plunger or die 14 has a strong spring 17 tending to push it in a radially outward direction in its mould or recess. The stationary guide or cam-track 13 during the rotation of the drum causes the die or plunger to move radially inwards or outwards as required, and finally, at the ejection position, the rollers leave the guide or cam-track at the point 18, and the ejection of the moulded dough is effected by the plunger under the action of its spring 17. It may be mentioned here that at the point 18 in the cam-track 13 close to the ejection position there is a sharp rise in the cam track which causes the plunger spring to be strongly compressed, and then the track terminates in a sharp edge 19 over which the rollers drop. This arrangement permits the compressed spring of the plunger to suddenly expand, and enables a forcible ejection of the moulded dough piece to take place.

As the drum further rotates, the rollers 16 attached to the plunger or die 14 are automatically returned to the stationary guide, so that by the time the drum has reached its top or charging position the die or plunger is drawn inwardly to its full extent at point 13$^a$, so that the maximum space is available for the reception of the dough pieces from the wire cut off depositors 7. As the drum rotates from the charging position to a point before the ejection takes place, the die or plunger moves outwardly (due to the action of its spring and under the control of the cam-track) to press the dough against a member closing the mouth of the mould sufficiently to mould and emboss the dough. The ejection of the dough is effected by the release of the die under the action of its spring a projection 35 on the die stem or extension striking a stop 36, thus causing the moulded dough piece to be forcibly ejected on to the conveyor belt, which, like the drum is momentarily at rest at this time.

I provide means carried by the rotary drum adapted to move over and close the top or mouth of the moulds and form an abutment against which the pieces of dough are pressed by the dies or plungers during the moulding and embossing operation, and to move clear of the moulds just before the ejection position is reached, so that there shall be no obstruction to the ejection of the moulded dough piece. For this purpose in the construction illustrated in the drawings, I provide plates 20 carried on the drum 1 and slidable in slots 21 formed in circumferential ribs 22 and parallel with the faces of the rotary drum, one plate being arranged for each row of moulds on the drum periphery. These sliding plates 20 are formed with openings 20$^a$ suitably corresponding in size to the mouth of the moulding cells or recesses in the drum, and the plates are fitted with a spring 23 which tends to force the plate into the closed position, that is, with the openings 20$^a$ in the plate out of register with the moulds.

The plates 20 are operated in such a manner that immediately after each row of moulds has passed the charging position below the dough dividers 7, the corresponding plate 20 is released and is forced by its spring 23 to slide over the top of the moulds 12 to close them. It will be understood that during this movement the plate will not come in contact with the pieces of dough 24, as the latter are lying at the bottom of the moulds and the plungers 14 are in the retracted position.

In order to draw back the plates 20 from the closed to the open position after the moulding and the embossing has been effected, and before the ejection position is reached, suitable trip mechanism is provided that will cause the plates to be drawn back at the proper time to bring the openings 20$^a$ therein into register with the moulds 12 in the drum, and enable the ejection of the moulded biscuit to take place through the open end of the mould. The moulded dough piece, it may be mentioned, is slightly drawn inward in the mould before the plate is moved back owing to an inward movement of the plunger after the moulding and embossing has taken place.

The trip mechanism, which is provided at each end of the plates, may comprise a bell-crank lever 25 fulcrumed on a lug 26 on the sliding plate 20 and having at the end of one arm a roller 27 passing through a slot 28 in an end-plate 2. The end plate 2 is secured by suitable means to the rotary drum, so as to rotate therewith and is spaced therefrom by suitable distance pieces 56. The other end of the bell-crank lever 25 is adapted to come into contact with a stop 29 provided at a suitable point, which will cause the said lever to move back in its slot 28, in a direction contrary to the rotation of the drum until the roller 27 sinks into a recess 30 at the end of the slot, and the lever is rocked to clear the stop 29. By this means the sliding plate 20 is slid back and held in the open position against the pressure of its spring 23. This operation takes place just before the ejection position is reached so that the plate is brought with its openings 20ª in register with the moulds 12. The ejection of the moulded dough piece then takes place, as already described, by the spring-actuated die or plunger when the mould reaches the ejection position, which it will be seen, is diametrically opposite the charging position and at the lowest point in the rotation of the drum. The sliding plate is held in the open position against the pressure of its spring until by the continued rotation of the drum the mould has reached and just passed the charging position, whereupon the roller 27 on the bell crank lever arm 25 is brought into contact with a fork 31 having its arms formed with an inclined surface up which the two ends of the roller run, which has the effect of raising the lever arm out of the recess 30 at the end of the slot 28, and so releases it. The spring 23 on the plate then acts to slide the plate 20 again over the mouth of the moulds in readiness for the moulding and embossing operation.

When the drum 1 is in the position for charging and discharging the bell-crank levers 27 of the plate 20 of the row of moulds next in order for discharging are resting on the stop member 29 ready for operation at the next movement. During the rest period the stop 29 together with the bell crank lever 27 forms a suitable device for holding the drum, which is unbalanced owing to the dough pieces being on one side of the drum only. If necessary a cantilever leaf spring 32 can be attached to the stop 29 which will meet the projection on the bell-crank lever arm and cause the sliding plate 20 to begin to move before the actual stop 29 comes into operation.

The moulding and embossing die or plunger 1 may be fitted centrally with a movable pin or pins 33 (Figure 4) or the like, controlled by a spring 34, and having for its purpose to assist the ejection by moving out relative to the die or plunger and thus breaking the contact of the piece of dough to a certain extent with the die 14 preparatory to the ejection of the dough piece by the die or plunger. The momentum due to the spring-controlled die or plunger 14 moving down in its mould 12 and being suddenly arrested by the stop 36 causes the central movable pin 33 to move forward and helps to assist the ejection of the dough piece.

Provision may be made if necessary to dust or grease the moulds and plates to prevent the dough adhering.

The molded and embossed dough pieces can be ejected direct on to the pans carried by a conveyor that travels through the oven denoted by 38.

The general arrangement of the apparatus and its driving mechanism will be understood with reference to Figure 1. The wire cut depositor 7 arranged above the rotary drum has its rolls 9 driven by a shaft 39 driven by bevel gearing 40 from the main driving shaft 41, which also drives a crank 42 connected by a rod 43 to a bell-crank lever 44. This lever operates adjustable ratchet gear 45 that drives the endless conveyor 5, which is guided over the usual guide rollers or the like 46. The other end of the bell-crank lever 44 is connected by rod 47 to a bell-crank lever 48 for the purpose of intermittently driving the drum 1 by means of the ratchet gear 49, which is designed at each stroke to rotate the drum through 45°. The conveyor 5 and the drum 1 work synchronously. The reciprocating wire-cutter 11 is operated by a lever 53 actuated by the crank-disc 54.

The members 50 of the cam track 13 are arranged as shown in Figure 3, so that the roller 16 and their pivot pins of the plungers may be easily assembled. Each member of the cam track is independent and positioned on the stationary track 3 by means of a key 52.

It will be understood from the foregoing description that by the present invention the least possible pressure only is applied to the dough, therefore the quality of the goods so made is higher than by other means using more pressure.

The moulding and embossing system described can be arranged to form part of an automatic plant in which, after the panning, the biscuits are then carried on through a travelling oven and then through a cooling chamber to a station for wrapping or packeting by suitable mechanism. By this means an automatic system would be provided, and the biscuits would not be touched by hand at all during their manufacture.

I declare that what I claim is:—

1. Apparatus for the manufacture of biscuits or the like, comprising, in combination, a rotary drum having a plurality of radial recesses in its periphery forming moulds, means for rotating said drum, means for producing separate pieces of dough of predetermined size and weight to form each a single biscuit and feeding them into said moulds, spring-operated and cam-controlled plungers movable in said moulds and adapted during their outward movement to mould and emboss the dough pieces during the rotation of the drum, means carried by the said rotary drum for closing the mouths of the moulding recesses, in which the moulding and embossing are being performed during the moulding and embossing operation, and means whereby the moulded and embossed pieces are ejected from the moulds by the said spring-operated plungers at a suitable point in the rotation of the drum.

2. Apparatus for the manufacture of biscuits or the like, comprising, in combination, a rotary drum having a plurality of radial recesses in its periphery forming moulds, means for rotating said drum, means for producing separate pieces of dough of predetermined size and weight to form each a single biscuit, said means being arranged directly above the rotary drum so that the dough pieces produced will drop into the moulds for the time being situated directly below, spring-operated and cam controlled plungers radially movable in said moulds and having means adapted during their outward movement to mould and emboss the dough pieces in the moulds, means carried by the rotary drum for closing the mouths of the moulds in which the moulding and embossing are being performed during the moulding and embossing operation, and means for moving said plungers and for causing the ejection of the moulded and embossed dough pieces from the moulds at a point in the rotation of the drum diametrically opposite that at which the dough pieces are fed into the moulds.

3. Apparatus for the manufacture of biscuits or the like, comprising, in combination a rotary drum having a plurality of radial recesses in its periphery forming moulds, means for rotating the drum, means for producing pieces of dough of predetermined size and weight to form such a single biscuit and feeding them into said moulds, spring-operated and cam-controlled plungers radially movable in said moulds adapted during their outward movement to mould and emboss the dough pieces in the moulds, means for moving the plungers in said moulds and for ejecting the moulded pieces from the moulds at a point in the rotation of the drum, and means carried by the drum for closing the mouths of the moulds in which the moulding and embossing are being performed during the moulding and embossing operation, comprising slidable apertured plates, springs tending to hold said plates in their closed position, and trip-mechanism adapted to move the plates into the open position immediately before the said moulds reach the ejection position, and to release the plates immediately after the charging position is passed.

4. Apparatus for the manufacture of biscuits or the like, comprising, in combination, a rotary drum having a plurality of radial recesses in its periphery forming moulds, means for rotating the drum, means for producing pieces of dough of predetermined size and weight to form each a single biscuit and feeding them into said moulds, plungers radially movable in said moulds adapted to mould and emboss the dough pieces in the moulds, means carried by the drum for closing the mouths of the moulds during the moulding and embossing operation, springs tending to press the plungers radially outwards in the moulds, and means for controlling the movements of the plungers comprising a stationary cam track upon which rollers on an extension of the plungers run, the cam track being of such form that the rollers leave the cam track at the ejection position and permit the ejection of the moulded pieces by the plungers under the action of their springs.

5. Apparatus for the manufacture of biscuits or the like, comprising in combination a rotary drum having a plurality of radial recesses in its periphery forming moulds, means for intermittently rotating the said drum, means for feeding into said moulds dough pieces of a required size and weight to form each a separate biscuit into said moulds, spring operated and cam controlled plungers radially movable in the moulds and adapted during their outward movement to mould and emboss the dough pieces during the rotation of the drum, means for closing the mouths of the moulding recesses in which the moulding and embossing operation is being performed, and means for moving said plungers in the moulds and for causing the ejection of the moulded and embossed pieces from the moulds at a point in the drum diametrically opposite to that at which the dough pieces are fed into the moulds and while the drum is at rest.

6. Apparatus for the manufacture of biscuits or the like, comprising in combination a rotary drum having a plurality of recesses in its periphery forming moulds, means for intermittently rotating said drum, plungers movable in said moulds and adapted to mould and emboss therein dough pieces of a predetermined size and weight to form each a separate biscuit, fed into said moulds, means carried by the rotary drum to close the mouths of the moulds in which the moulding and embossing operation is being performed and upon the conclusion of said operation to leave the mouths of said recesses clear in readiness for the ejection of the moulded pieces, and means for moving the plungers in the moulds and for ejecting the moulded and embossed pieces from the moulds at a suitable point in the rotation of the drum.

7. Apparatus for the manufacture of biscuits or the like, comprising in combination a rotary drum having a plurality of radial recesses in its periphery forming moulds, means for intermittently rotating the drum, means for producing pieces of dough of a required size and weight to form each a separate biscuit and feeding them into said moulds, plungers radially movable in said moulds adapted during their outward movement to mould and emboss the dough pieces in the moulds, means for moving the plungers in the recesses, means for ejecting the moulded pieces from the moulds at a point in the rotation of the drum, and means carried by the drum for closing the mouths of the molds in which the moulding and embossing is being performed comprising slidable apertured plates, springs tending to hold said plates in their closed position, and trip mechanism adapted to move the plates into the open position immediately before the drum reaches the ejection position and to release the plates immediately after the charging position is passed.

8. Apparatus for the manufacture of biscuits or the like comprising in combination a rotary drum, means for intermittently rotating the drum, a plurality of radial recesses in the periphery of said drum forming moulds, plungers radially movable in said moulds adapted to mould and emboss dough pieces of a required size and weight, to form each a separate biscuit, fed into said moulds, means for closing the mouths of the moulds during the moulding and embossing operation, springs tending to press the plungers radially outwards in the moulds, and means for controlling the movements of the plungers comprising a stationary cam track upon which rollers on an extension of the plungers run, the cam track being of such form that the rollers leave the cam track at the ejection position and permit the ejection of the moulded pieces by the plungers under the action of their springs.

9. Apparatus for the manufacture of biscuits or the like comprising in combination a rotary drum having a plurality of recesses in its periphery forming moulds, means for rotating the drum, plungers movable in said moulds and adapted to mould and emboss therein dough pieces of a predetermined size and weight, to form each a separate biscuit, fed into said moulds, means for moving said plungers in said moulds, means for closing the mouths of the moulding recesses during the moulding and embossing operation, means for ejecting the molded and embossed pieces from the moulds at a point in the rotation of the drum, and means for loosening or breaking the contact of the dough with the plungers preparatory to the ejection.

10. Apparatus for the manufacture of biscuits or the like, comprising in combination a rotary drum having a plurality of recesses in its periphery forming moulds, means for rotating the drum, plungers movable in said moulds and adapted to mould and emboss therein dough pieces of a predetermined size and weight, to form each a separate biscuit, fed into said moulds, means for moving the plungers in the moulds, means for closing the mouths of the moulding recesses during the moulding and embossing operation, means for ejecting the moulded and embossed pieces from the moulds at a point in the rotation of the drum, and means for loosening or breaking the contact of the dough with the plungers preparatory to the ejection, comprising a spring-controlled pin movable in each plunger.

11. Apparatus for the manufacture of biscuits or the like comprising a dough-divider adapted to deliver pieces of dough of a predetermined size and weight to form each a separate biscuit, an intermittently rotating drum having a plurality of radial recesses in its periphery forming moulds, said drum being arranged directly below the said dough-divider so that the dough pieces will drop into the moulds for the time being situated directly below the said divider, means for intermittently rotating the drum, spring-operated and cam controlled plungers radially movable in said moulds and adapted during their outward movement to mould and emboss the said pieces, means for actuating the dough-divider so that the delivery of the dough pieces coincides with the rest periods of the drum, means carried by the rotary drum for closing the mouths of the moulds in which the moulding and embossing are being performed during the moulding and embossing operation, and means whereby the moulded and embossed pieces are ejected by the said plungers from those moulds which have reached the lowest point in the rotation of the drum simultaneously with the feeding of dough pieces into those moulds which have been brought directly below the dough divider.

12. Apparatus for the manufacture of biscuits or the like, comprising a dough divider adapted to deliver pieces of dough of predetermined size and weight to form each a separate biscuit, an intermittently rotated drum or the like having a plurality of cells or recesses on its periphery or outer surface forming moulds, the said drum being arranged directly below the dough divider so that the dough pieces will drop into the said moulds which are for the time being situated directly below the said divider, spring-operated and cam-controlled plungers radially movable in said moulds and adapted during their outward movement to mould and emboss the said pieces, means for actuating the dough-divider so that the delivery of the dough pieces coincides with the rest periods of the rotary drum, means carried by the rotary drum for closing the mouths of the moulds in which the moulding and embossing are being performed during the moulding and embossing operation, an endless conveyor arranged directly below the drum, means whereby the moulded and embossed dough pieces are ejected from the moulding cells in the drum by the said plungers simultaneously with the feeding of the dough pieces from the dough divider, and means whereby the said drum and the endless conveyor are driven synchronously so that the rest periods of the said drum and the conveyor will synchronize with the ejection of the dough pieces on to the conveyor.

In witness whereof, I have hereunto signed my name this 31 day of May, 1927.

WILLIAM DREDGE.